(12) United States Patent
Tanaka et al.

(10) Patent No.: US 11,655,612 B2
(45) Date of Patent: May 23, 2023

(54) WORK MACHINE

(71) Applicant: HITACHI CONSTRUCTION MACHINERY CO., LTD., Tokyo (JP)

(72) Inventors: Hiroaki Tanaka, Kasumigaura (JP); Hisami Nakano, Tsuchiura (JP); Yuusuke Suzuki, Tsuchiura (JP); Hiroshi Sakamoto, Hitachi (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 303 days.

(21) Appl. No.: 16/981,508

(22) PCT Filed: Jun. 13, 2019

(86) PCT No.: PCT/JP2019/023409
§ 371 (c)(1),
(2) Date: Sep. 16, 2020

(87) PCT Pub. No.: WO2020/049821
PCT Pub. Date: Mar. 12, 2020

(65) Prior Publication Data
US 2021/0115643 A1 Apr. 22, 2021

(30) Foreign Application Priority Data
Sep. 5, 2018 (JP) .............................. JP2018-166397

(51) Int. Cl.
*E02F 3/43* (2006.01)
*B60K 35/00* (2006.01)
(Continued)

(52) U.S. Cl.
CPC .............. *E02F 3/435* (2013.01); *B60K 35/00* (2013.01); *E02F 3/32* (2013.01); *E02F 9/2004* (2013.01);
(Continued)

(58) Field of Classification Search
CPC ........ B60K 2370/152; B60K 2370/162; B60K 35/00; B60Y 2200/411; E02F 3/32;
(Continued)

(56) References Cited

U.S. PATENT DOCUMENTS 5,535,532 A 7/1996 Fujii et al.
6,317,669 B1 11/2001 Kurenuma et al.
(Continued)

FOREIGN PATENT DOCUMENTS

EP 3438468 A1 2/2019
JP 63-194032 A 8/1988
(Continued)

OTHER PUBLICATIONS

International Preliminary Report received in corresponding International Application No. PCT/JP2019/023409 dated Mar. 18, 2021.
(Continued)

*Primary Examiner* — Tyler J Lee
(74) *Attorney, Agent, or Firm* — Mattingly & Malur, PC

(57) ABSTRACT

To provide a work machine that can maintain the construction precision of semi-automatic control irrespective of excavation depths and differences in soil nature. A controller acquires soil-nature information on the basis of an operation command given to a work implement, a bucket-claw-tip position outputted from a bucket-position measuring device, and a drive load of the work implement outputted from a load measuring device; generates a soil-nature map on the basis of the bucket-claw-tip position, and the soil-nature information; calculates an estimated load that is an estimate of an excavation load on the basis of the soil-nature map and a bucket-claw-tip target position; and corrects the operation command in accordance with the estimated load.

7 Claims, 14 Drawing Sheets

(51) Int. Cl.
*E02F 3/32* (2006.01)
*E02F 9/26* (2006.01)
*E02F 9/20* (2006.01)
*E02F 9/22* (2006.01)

(52) U.S. Cl.
CPC ............ *E02F 9/2029* (2013.01); *E02F 9/261* (2013.01); *E02F 9/265* (2013.01); *B60K 2370/152* (2019.05); *B60K 2370/162* (2019.05); *E02F 9/2246* (2013.01)

(58) Field of Classification Search
CPC ....... E02F 3/435; E02F 9/2004; E02F 9/2029; E02F 9/2246; E02F 9/261; E02F 9/262; E02F 9/265
See application file for complete search history.

(56) References Cited

U.S. PATENT DOCUMENTS

| | | | | |
|---|---|---|---|---|
| 9,043,098 | B2* | 5/2015 | Nomura | E02F 9/264 |
| | | | | 701/445 |
| 9,556,594 | B2* | 1/2017 | Shimano | E02F 9/2029 |
| 10,422,111 | B2* | 9/2019 | Yamada | E02F 9/265 |
| 10,533,303 | B2* | 1/2020 | Tsuchie | E02F 9/2004 |
| 11,230,824 | B2* | 1/2022 | Narikawa | E02F 9/262 |
| 2012/0130599 | A1 | 5/2012 | Faivre et al. | |
| 2014/0099178 | A1* | 4/2014 | Nomura | E02F 9/26 |
| | | | | 414/685 |
| 2014/0100712 | A1* | 4/2014 | Nomura | E02F 9/264 |
| | | | | 701/1 |
| 2016/0258128 | A1 | 9/2016 | Nakamura et al. | |
| 2016/0258135 | A1* | 9/2016 | Shimano | E02F 3/435 |
| 2018/0080193 | A1* | 3/2018 | Myers | E02F 9/2083 |
| 2018/0230671 | A1 | 8/2018 | Wu | |

FOREIGN PATENT DOCUMENTS

| | | |
|---|---|---|
| JP | 07-158105 A | 6/1995 |
| JP | 2001-123478 A | 5/2001 |
| JP | 3704092 B2 | 10/2005 |
| JP | 2011-252338 A | 12/2011 |
| JP | 2016-160718 A1 | 9/2016 |
| JP | 2016-169571 A | 9/2016 |
| JP | 2016-169572 A | 9/2016 |
| JP | 2017-18071 A | 10/2017 |
| JP | 2018-135681 A | 8/2018 |
| WO | 2016/129708 A1 | 8/2016 |
| WO | 2017047695 A1 | 3/2017 |

OTHER PUBLICATIONS

International Search Report of PCT/JP2019/023409 dated Jul. 30, 209.

* cited by examiner

WORK MACHINE

TECHNICAL FIELD

The present invention relates to work machines such as hydraulic excavators.

BACKGROUND ART

Conventional known hydraulic systems mounted on work machines such as hydraulic excavators include one including: a prime mover such as an engine; a hydraulic pump driven by the prime mover; an actuator driven by a hydraulic fluid delivered from the hydraulic pump; and a directional control valve that controls the direction and flow rate of the hydraulic fluid supplied from the hydraulic pump to the actuator. The operation direction and operation velocity of the actuator is determined through operation, by an operator, of an operation device such as an operation lever provided to the work machine.

Patent Documents 1 and 2, for example, disclose excavators having semi-automatic control functions that can assist operation by an operator in work for excavating a ground to form a designed surface (semi-automatic excavators).

Patent Document 1 describes a work machine controller that controls a work implement provided to a work machine for construction of a construction subject, the work machine controller including: a control section that controls the work implement such that a work device provided to the work implement does not penetrate into a predetermined target shape; and a switching section that, on the basis of the posture of the work device relative to a target construction terrain profile that is a finished target shape of the construction subject, sets the target shape to the target construction terrain profile or an offset terrain profile that is offset from the target construction terrain profile by a predetermined distance.

Patent Document 2 describes an excavator including: a lower travel structure; an upper swing structure mounted on the lower travel structure; an attachment (work implement) attached to the upper swing structure; a posture sensor that detects the posture of the attachment; and a controller. In the excavator, the controller acquires information about the current shape of a work-subject ground on the basis of the transition of the posture of the attachment detected by the posture sensor, decides whether the attachment is in contact with the work-subject ground on the basis of the posture of the attachment detected by the posture sensor, and the acquired information about the current shape of the work-subject ground, and increases the driving force of the attachment in a case where it is decided that the attachment is in contact with the work-subject ground.

PRIOR ART DOCUMENT

Patent Documents

Patent Document 1: PCT Patent Publication No. WO2016/129708
Patent Document 2: JP-2016-169571-A

SUMMARY OF THE INVENTION

Problem to be Solved by the Invention

Meanwhile, in a case where excavation of a ground is performed with an excavator that is not a semi-automatic excavator, an operator performs operation such that the excavator is operated as intended, by taking into consideration excavation depths and the nature of soil in the ground (mainly, the hardness of the ground). For example, when construction is performed to dig down the ground, the soil nature is estimated from the sense of operation at the last time of excavation, and the operation amount is adjusted in accordance with results of the estimation.

However, since the semi-automatic excavators described in Patent Documents 1 and 2 do not take soil nature into consideration when the work implements (attachments) are controlled, operation of the work implements varies in accordance with the soil nature even in a case where the work implements are controlled in similar manners. As a result, it becomes difficult to perform excavation of a ground whose soil nature is not uniform, to form designed surfaces.

The present invention has been contrived in view of the above problem, and an object of the present invention is to provide a work machine that can maintain the construction precision of semi-automatic control irrespective of excavation depths and differences in soil nature.

Means for Solving the Problem

In order to achieve the object, the present invention provides a work machine including: a work implement having a boom, an arm and a bucket; an operation device that gives an instruction to operate the work implement; a controller that controls operation of the work implement in accordance with an operation signal outputted from the operation device; a construction-target determining device that determines a construction target; and a bucket-position measuring device that measures a claw-tip position of the bucket. The controller converts the operation signal outputted from the operation device into an operation command given to the work implement, and corrects the operation command in accordance with the construction target outputted from the construction-target determining device. The work machine includes a load measuring device that measures a drive load of the work implement. The controller calculates a bucket-claw-tip target position on the basis of the construction target outputted from the construction-target determining device, and a bucket-claw-tip position outputted from the bucket-position measuring device; acquires soil-nature information on the basis of the operation command, the bucket-claw-tip position outputted from the bucket-position measuring device and the drive load outputted from the load measuring device; generates a soil-nature map on the basis of the bucket-claw-tip position and the soil-nature information; calculates an estimated load that is an estimate of an excavation load on the basis of the soil-nature map and the bucket-claw-tip target position; and corrects the operation command in accordance with the estimated load.

According to the thus-configured present invention, the soil-nature information is acquired on the basis of the operation command given to the work implement, the bucket-claw-tip position outputted from the bucket-position measuring device, and the drive load outputted from the load measuring device; the soil-nature map is generated on the basis of the bucket-claw-tip position, and the soil-nature information; the estimated load that is an estimate of the excavation load is calculated on the basis of the soil-nature map and the bucket-claw-tip target position; and the operation command is corrected in accordance with the estimated load. Thereby, the operation command according to semi-automatic control is corrected in accordance with excavation depths and differences in the soil nature, thus it becomes possible to maintain the construction precision of the semi-automatic control irrespective of the excavation depths and the differences in the soil nature.

Advantages of the Invention

According to the present invention, it becomes possible for a work machine having a semi-automatic control function to maintain the construction precision of semi-automatic control irrespective of excavation depths and differences in soil nature.

MODES FOR CARRYING OUT THE INVENTION

Figure 1:
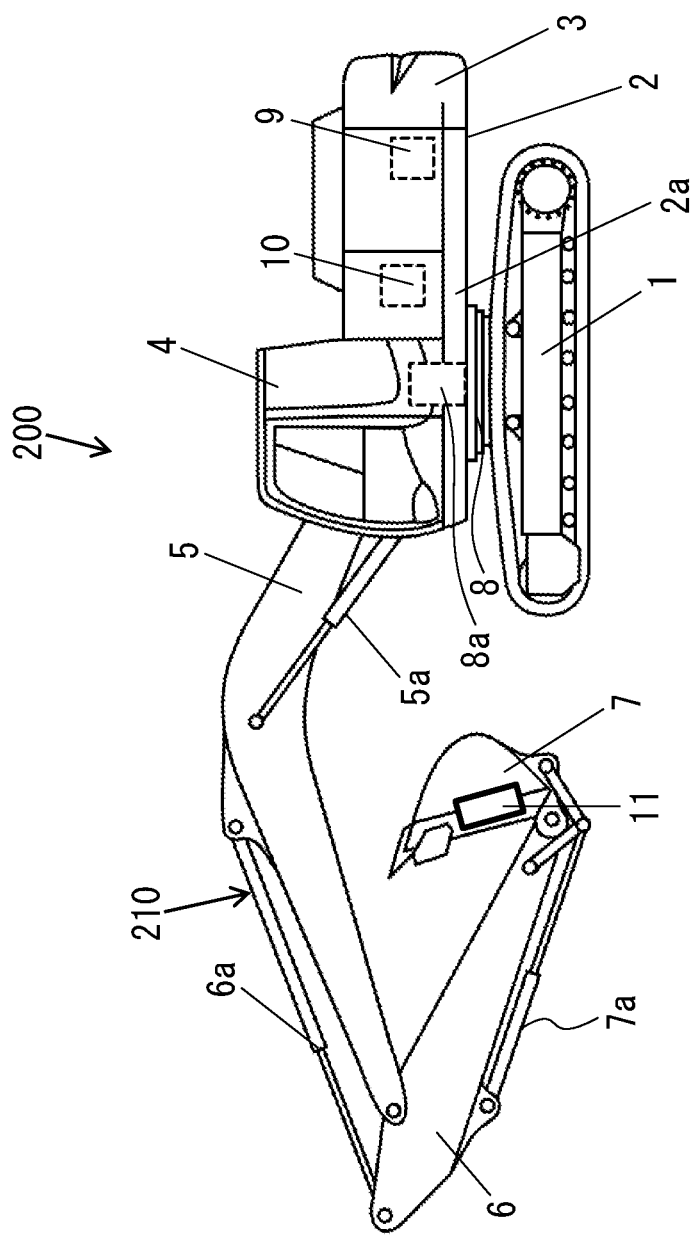
FIG. 1 is a side view illustrating a hydraulic excavator according to a first embodiment of the present invention.

In the following, a hydraulic excavator is explained as an example work machine according to embodiments of the present invention with reference to the drawings. Note that equivalent members are given the same reference characters through the drawings, and overlapping explanation is omitted as appropriate.

First Embodiment

FIG. 1 is a side view illustrating a hydraulic excavator according to a first embodiment of the present invention.

As illustrated in FIG. 1, a hydraulic excavator 200 includes a travel structure 1, a swing structure 2 swingably mounted on the travel structure 1 via a swing device 8, and a front work implement 210 coupled to the front side of the swing structure 2 such that the front work implement 210 can pivot upward and downward.

The swing structure 2 has a swing frame 2a forming the base lower structure. The front side of the swing frame 2a is coupled with the front work implement 210 such that the front work implement 210 can pivot upward and downward. The rear side of the swing frame 2a has a counter weight 3 attached for counterbalancing the weight of the front work implement 210. The front left side of the swing frame 2a is provided with a cab 4. Left and right operation lever devices 15L and 15R (illustrated in FIG. 2) and the like as operation devices for operating the front work implement 210 and the swing structure 2 are arranged in the cab 4. A pump device 9, a swing motor 8a, a control valve unit 10 and the like are mounted on the swing frame 2a. The pump device 9 includes an engine (not illustrated) as a prime mover, and one or more hydraulic pumps to be driven by the engine. The swing motor 8a drives the swing device 8. The control valve unit 10 includes a plurality of directional control valves that control the flow of a hydraulic fluid supplied from the pump device 9 to the swing motor 8a and a plurality of hydraulic actuators including a boom cylinder 5a, an arm cylinder 6a, and a bucket cylinder 7a that are mentioned below.

The front work implement 210 includes: a boom 5 having a base end section that is coupled to the front right side of the swing frame 2a such that the boom 5 can pivot upward and downward; an arm 6 that is coupled to a tip section of the boom 5 such that the arm 6 can pivot upward and downward, and forward and backward, and is to be raised and lowered by the boom 5; a bucket 7 as a work device that is coupled to a tip section of the arm 6 such that the bucket 7 can pivot upward and downward, and forward and backward, and is to be raised and lowered by the boom 5 or the arm 6; the boom cylinder 5a that drives the boom 5; the arm cylinder 6a that drives the arm 6; and the bucket cylinder 7a that drives the bucket 7. The bucket 7 has a bucket-position measuring device 11 attached thereto. Note that although the bucket-position measuring device 11 is illustrated as being configured to measure the bucket-claw-tip position directly in FIG. 1, the bucket-position measuring device 11 may be configured to calculate the bucket-claw-tip position from the positional relationship among the swing structure 2, the boom 5, the arm 6 and the bucket 7.

Figure 2:
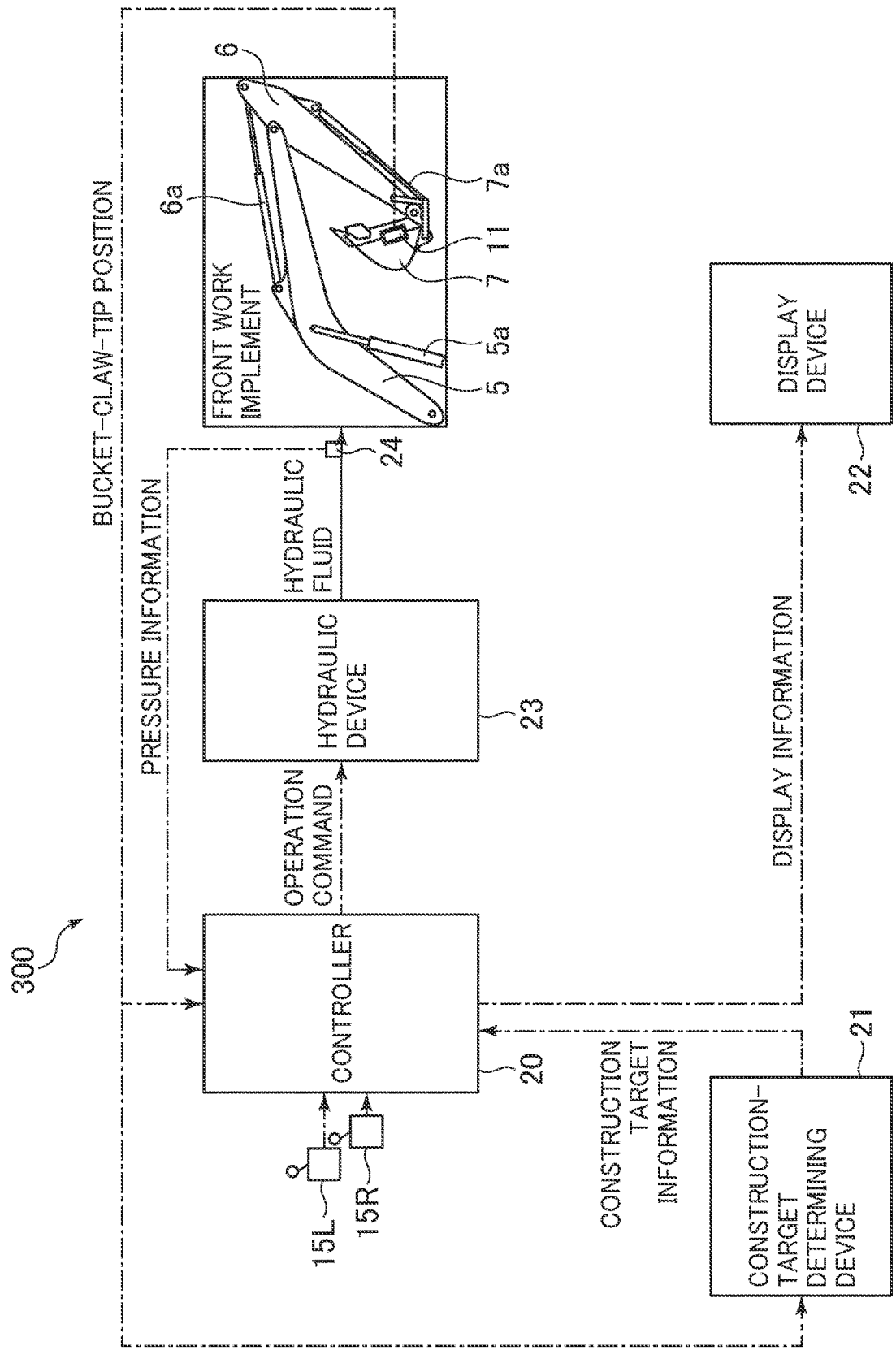
FIG. 2 is a schematic configuration diagram of a hydraulic control system mounted on the hydraulic excavator illustrated in FIG. 1.

FIG. 2 is a schematic configuration diagram of a hydraulic control system mounted on the hydraulic excavator 200.

As illustrated in FIG. 2, a hydraulic control system 300 includes: a controller 20; a construction-target determining device 21 for determining a construction target; a display device 22 that displays information outputted from the controller 20; the left and right operation lever devices 15L and 15R for instructing the controller 20 to operate the hydraulic excavator 200; the bucket-position measuring device 11; a pressure sensor 24; and a hydraulic device 23.

The left and right operation lever devices 15L and 15R output operation signals according to lever operation by an operator. The pressure sensor 24 converts the load pressures of the actuators 5a, 6a and 7a into pressure signals (pressure information), and outputs the pressure signals.

The controller 20 outputs an operation command to the hydraulic device 23 in accordance with operation signals from the left and right operation lever devices 15L and 15R, construction target information from the construction-target determining device 21, a bucket-claw-tip position from the bucket-position measuring device 11, and pressure information from the pressure sensor 24.

In accordance with an operation command from the controller 20, the hydraulic device 23 supplies the hydraulic fluid to the boom cylinder 5a, the arm cylinder 6a, the bucket cylinder 7a and the like, and drives the boom 5, the arm 6, the bucket 7 and the like.

Figure 3:
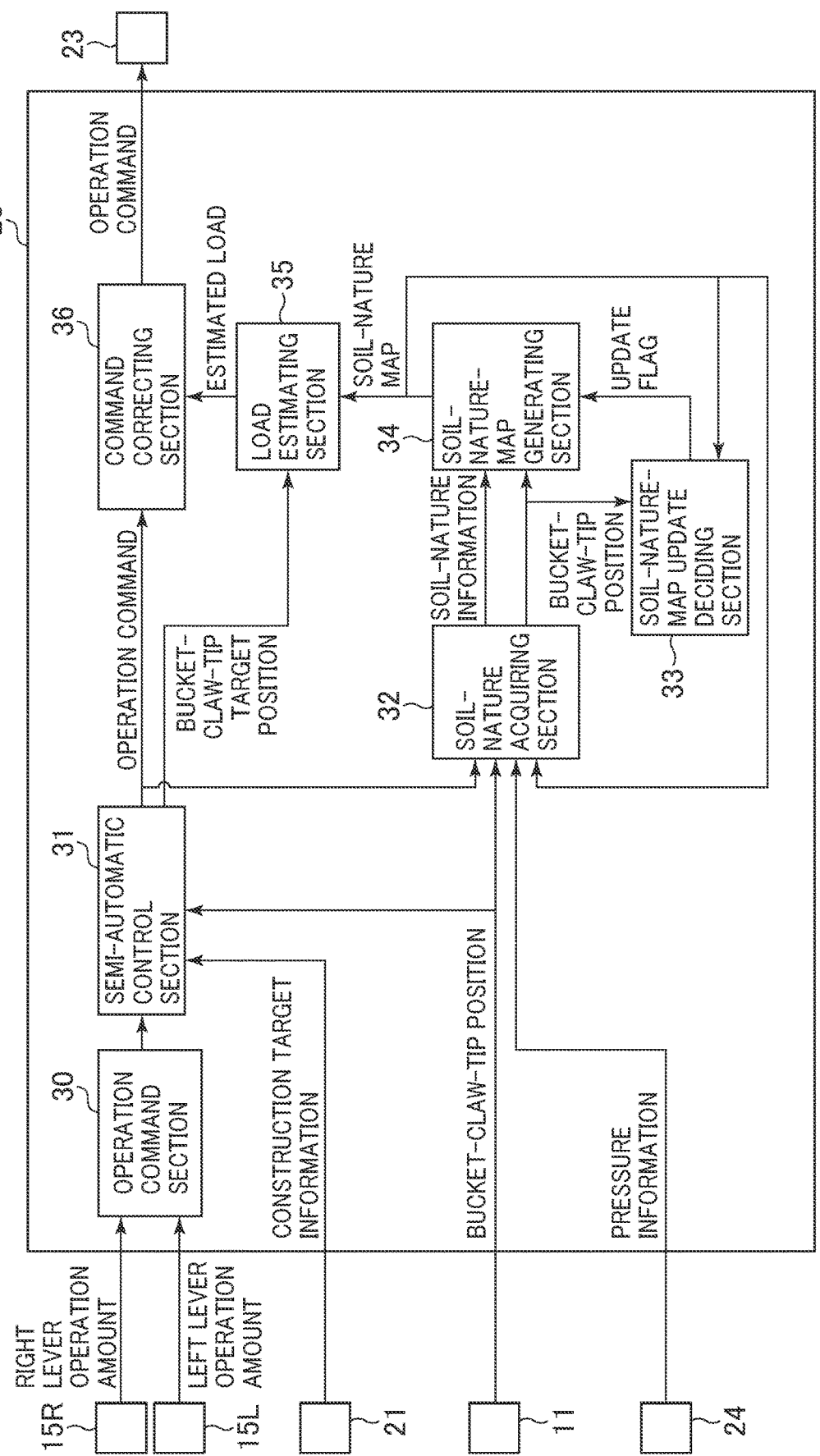
FIG. 3 is a functional block diagram of a controller illustrated in FIG. 2.

FIG. 3 is a functional block diagram of the controller 20.

As illustrated in FIG. 3, the controller 20 has an operation command section 30, a semi-automatic control section 31, a soil-nature acquiring section 32, a soil-nature-map update deciding section 33, a soil-nature-map generating section 34, a load estimating section 35 and a command correcting section 36.

On the basis of operation signals (left and right lever-operation amounts) input from the left and right operation lever devices 15L and 15R, the operation command section 30 determines target operation velocities of the actuator 5a, 6a and 7a, and outputs an operation command according to the target operation velocities to the semi-automatic control section 31.

The semi-automatic control section 31 receives an input of an operation command from the operation command section 30, an input of a bucket-claw-tip position from the bucket-position measuring device 11, and an input of construction target information from the construction-target determining device 21. In order to prevent excessive excavation by the bucket 7, the semi-automatic control section 31 corrects the operation command input from the operation command section 30 such that target operation velocities of actuators are restricted more as the deviation between the bucket-claw-tip position and a designed surface included in the construction target information decreases, and outputs the corrected operation command to the soil-nature acquiring section 32 and the command correcting section 36. In addition, on the basis of the bucket-claw-tip position and the designed surface included in the construction target information, the semi-automatic control section 31 calculates a bucket-claw-tip target position, and outputs the bucket-claw-tip target position to the load estimating section 35.

The soil-nature acquiring section 32 receives an input of a bucket-claw-tip position from the bucket-position measuring device 11, an input of pressure information from the pressure sensor 24, an input of an operation command from the semi-automatic control section 31, and an input of a soil-nature map from the soil-nature-map generating section 34 mentioned below. On the basis of these inputs, the soil-nature acquiring section 32 acquires information about the nature of the soil at the bucket-claw-tip position, and outputs the information to the soil-nature-map generating section 34. In addition, the soil-nature acquiring section 32 outputs the bucket-claw-tip position received from the bucket-position measuring device 11 to the soil-nature-map update deciding section 33 and the soil-nature-map generating section 34.

The soil-nature-map update deciding section 33 receives an input of a bucket-claw-tip position from the soil-nature acquiring section 32, and an input of a soil-nature map from the soil-nature-map generating section 34. On the basis of these inputs, the soil-nature-map update deciding section 33 decides whether or not it is necessary to update the soil-nature map, and outputs an update flag that indicates whether or not it is necessary to update the soil-nature map to the soil-nature-map generating section 34.

The soil-nature-map generating section 34 receives an input of a bucket-claw-tip position and soil-nature information from the soil-nature acquiring section 32, and an input of the update flag from the soil-nature-map update deciding section 33. The soil-nature-map generating section 34 keeps a soil-nature map unchanged (not updated) in a case where the update flag is OFF, and updates the soil-nature map with information about the nature of the soil at the bucket-claw-tip position in a case where the update flag is 1. The soil-nature-map generating section 34 outputs the soil-nature map to the soil-nature acquiring section 32, the soil-nature-map update deciding section 33 and the load estimating section 35.

On the basis of bucket-claw-tip target position information input from the semi-automatic control section 31 and a soil-nature map input from the soil-nature-map generating section 34, the load estimating section 35 calculates an estimate (estimated load) of the excavation load, and outputs the estimated load to the command correcting section 36.

The command correcting section 36 corrects an operation command input from the semi-automatic control section 31 in accordance with an estimated load input from the load estimating section 35, and outputs the operation command to the hydraulic device 23.

Figure 4:
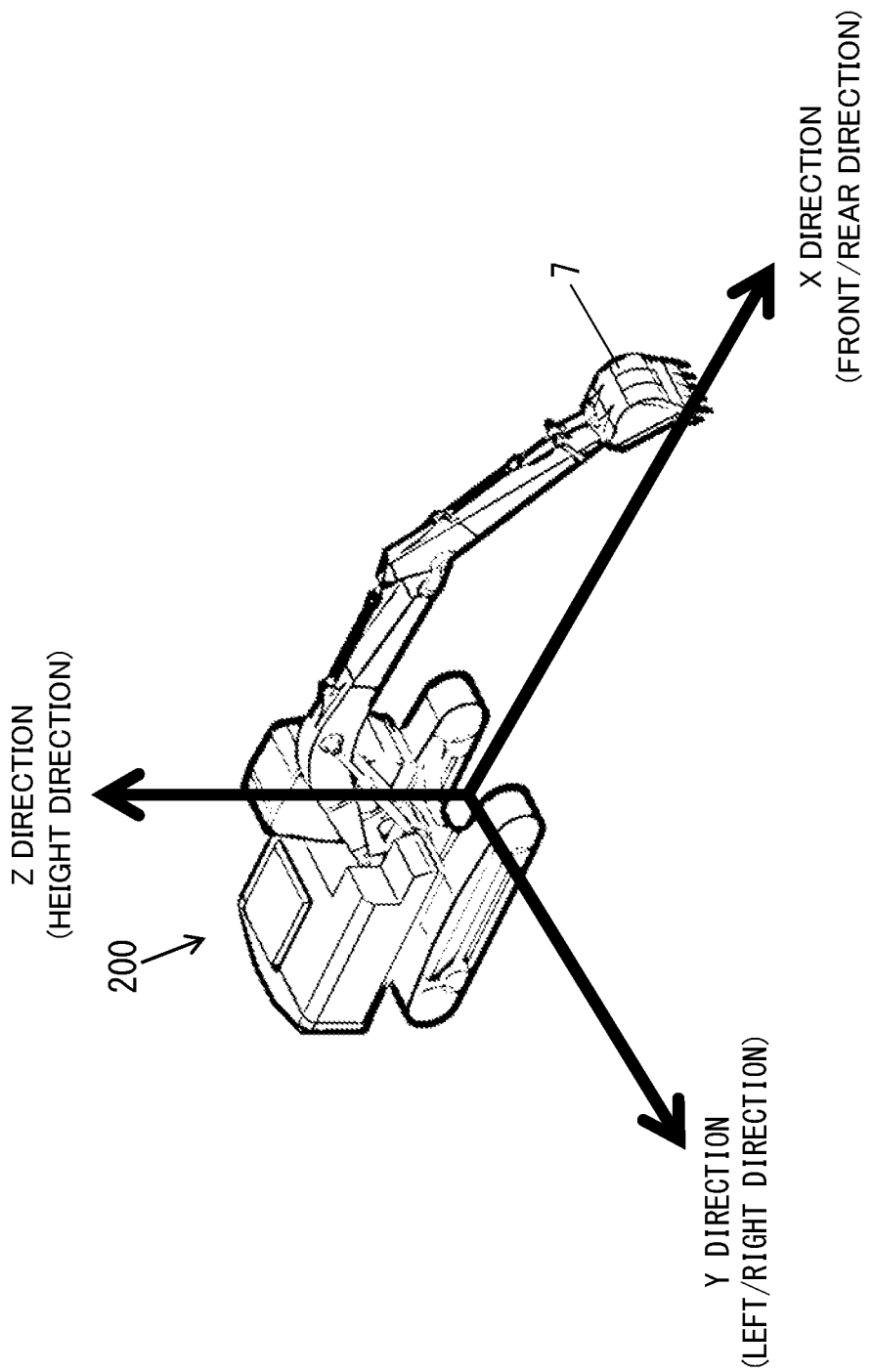
FIG. 4 is a figure illustrating a coordinate system for representing a bucket-claw-tip position outputted from a bucket position measurement system illustrated in FIG. 1 in a three-dimensional space.

FIG. 4 is a figure illustrating a coordinate system for representing a bucket-claw-tip position outputted from the bucket-position measuring device 11 in a three-dimensional space.

In FIG. 4, the X direction corresponds to the front/rear direction of the machine-body, the Y direction corresponds to the left/right direction of the machine-body, and the Z direction corresponds to the height direction of the machine-body. In the present embodiment, the bucket-claw-tip position in the front/rear and left/right directions of the machine-body is referred to as a bucket-claw-tip XY position, and the bucket-claw-tip position in the height direction of the machine-body is referred to as a bucket-claw-tip Z position.

Figure 5:
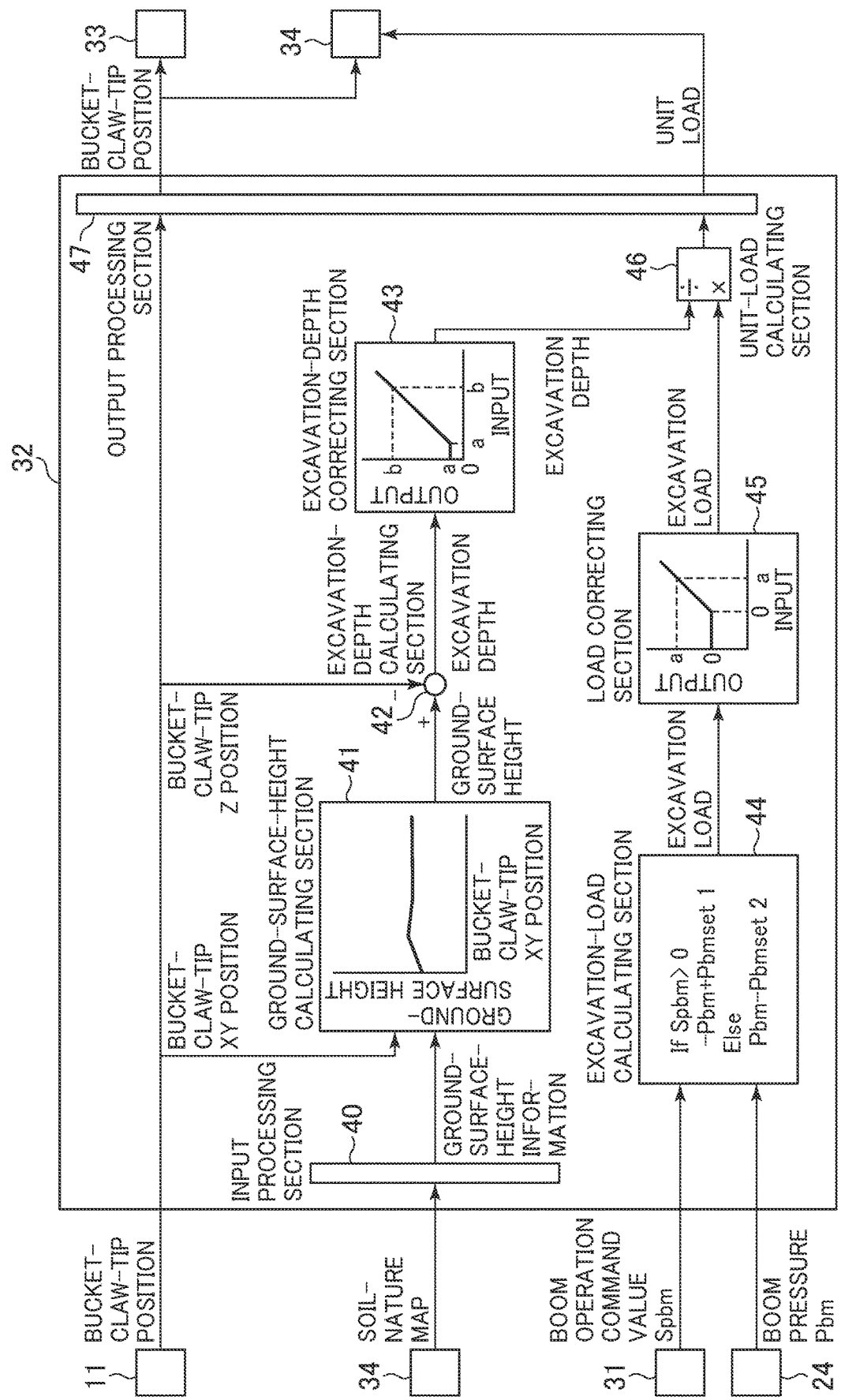
FIG. 5 is a figure illustrating a calculation logic of a soil-nature acquiring section illustrated in FIG. 3.

FIG. 5 is a figure illustrating a calculation logic of the soil-nature acquiring section 32.

In FIG. 5, the soil-nature acquiring section 32 has an input processing section 40, a ground-surface-height calculating section 41, an excavation-depth calculating section 42, an excavation-depth correcting section 43, an excavation-load calculating section 44, a load correcting section 45, a unit-load calculating section 46 and an output processing section 47.

The input processing section 40 extracts ground-surface-height information from a soil-nature map input from the soil-nature-map generating section 34, and outputs the ground-surface-height information to the ground-surface-height calculating section 41. Here, the ground-surface-height information is information in which ground-surface heights are associated with horizontal positions of a construction-subject ground surface.

On the basis of ground-surface-height information input from the input processing section 40, and a bucket-claw-tip XY position included in bucket-claw-tip information, the ground-surface-height calculating section 41 calculates a ground-surface height at the bucket-claw-tip XY position, and outputs the ground-surface height to the excavation-depth calculating section 42.

Figure 6:
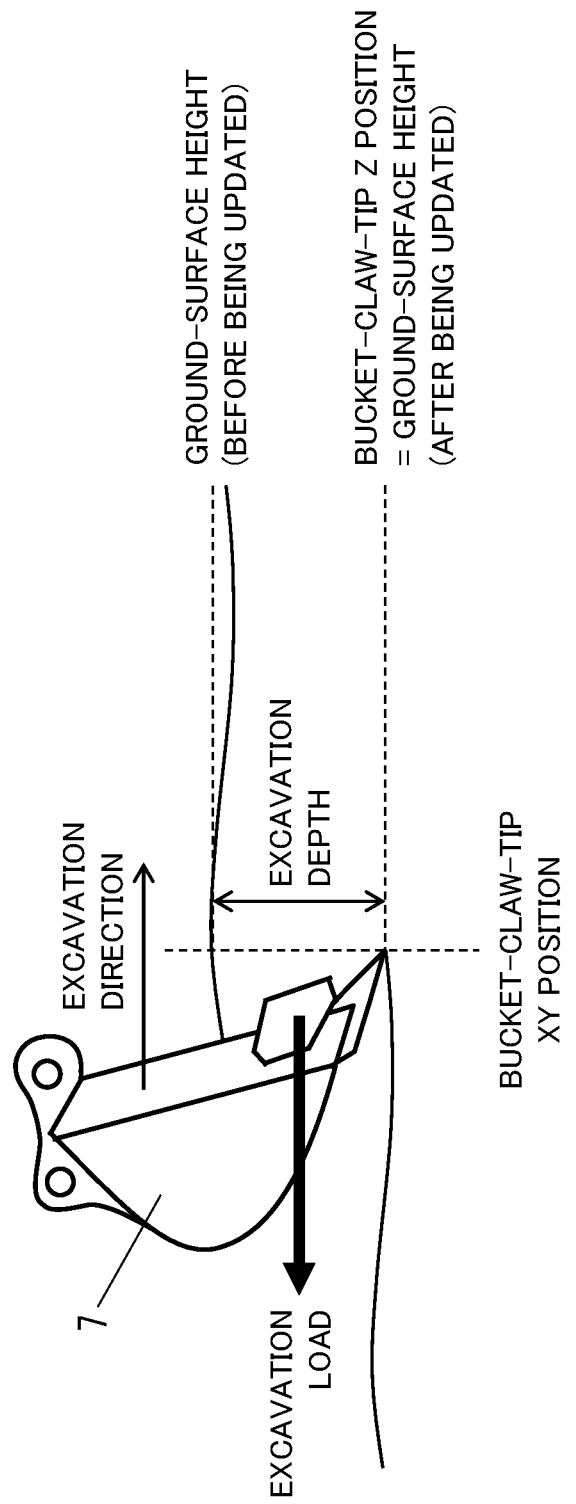
FIG. 6 is a figure illustrating the relationship among a bucket-claw-tip position, a ground-surface height and an excavation depth.

The excavation-depth calculating section 42 calculates an excavation depth by subtracting a bucket-claw-tip Z position included in bucket-claw-tip information input from the bucket-position measuring device 11 from a ground-surface height input from the ground-surface-height calculating section 41, and outputs the excavation depth to the excavation-depth correcting section 43. The relationship among the bucket-claw-tip position, the ground-surface height and the excavation depth is illustrated in FIG. 6.

Returning to FIG. 5, the excavation-depth correcting section 43 corrects an excavation depth input from the excavation-depth calculating section 42 such that the excavation depth does not become a value equal to or smaller than 0, and outputs the excavation depth to the unit-load calculating section 46. Specifically, in a case where the excavation depth input from the excavation-depth calculating section 42 falls below a threshold a set to a value slightly larger than 0, the excavation depth is set to a, and output. Correction is performed at the excavation-depth correcting section 43 in this manner in order to prevent divergence of calculation results of the unit-load calculating section 46 mentioned below.

The excavation-load calculating section 44 receives an input of an operation command from the semi-automatic control section 31, and an input of pressure information from the pressure sensor 24. On the basis of a boom operation command value Spbm included in the operation command and a boom pressure Pbm included in the pressure information, the excavation-load calculating section 44 calculates an excavation load, and outputs the excavation load to the load correcting section 45. For example, if the boom is to be raised (Spbm>0), the excavation load is calculated as −Pbm+Pbmset1, and if the boom is not to be raised, the excavation load is calculated as Pbm−Pbmset2. Here, Pbmset1 and Pbmset2 are fixed values. For example, Pbmset1 is set to a value that is approximately the same as a boom pressure applied when the boom 5 is kept in the air, and Pbmset2 is set to a value that is approximately the same as a boom pressure applied immediately after boom-lowering operation is started in a state in which the bucket 7 is kept in contact with a ground (i.e. Pbmset2 is a very small value that is far smaller than Pbmset1). The calculation formula for excavation loads is varied depending on whether or not the boom is to be raised because whether the hydraulic fluid delivered from the pump device 9 flows into the bottom side of the boom cylinder 5a or into the rod side of the boom cylinder 5a, and the direction and magnitude of force of the hydraulic fluid applied to the boom 5 vary depending on the boom operation direction.

The load correcting section 45 corrects an excavation load input from the excavation-load calculating section 44 such that the excavation load becomes a value equal to or larger than 0, and outputs the excavation load to the unit-load calculating section 46. Correction is performed at the load correcting section 45 in this manner in order to prevent the excavation load from becoming a negative value.

The unit-load calculating section 46 calculates a load per unit excavation depth (unit load) by dividing an excavation load input from the load correcting section 45 by an excavation depth input from the excavation-depth correcting section 43, and outputs the unit load to the output processing section 47.

The output processing section 47 outputs a bucket-claw-tip position input from the bucket-position measuring device 11 to the soil-nature-map update deciding section 33 and the soil-nature-map generating section 34, and outputs a unit load input from the unit-load calculating section 46 to the soil-nature-map generating section 34.

By configuring the soil-nature acquiring section 32 in this manner, an excavation load per unit excavation depth (unit load) can be determined on the basis of an excavation depth and a load applied to the boom 5.

Figure 7:
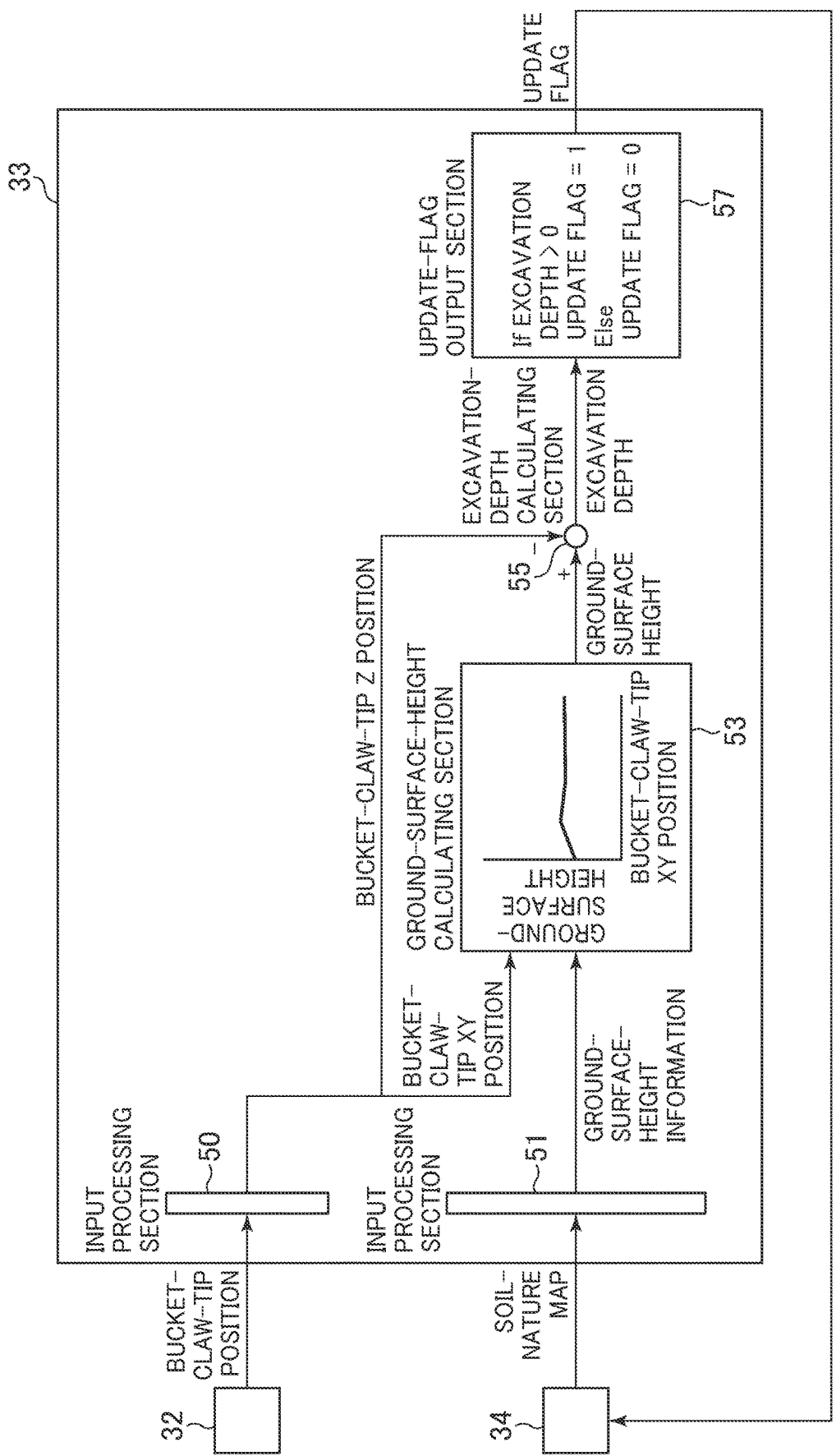
FIG. 7 is a figure illustrating a calculation logic of a soil-nature-map update deciding section illustrated in FIG. 3.

FIG. 7 is a figure illustrating a calculation logic of the soil-nature-map update deciding section 33.

In FIG. 7, the soil-nature-map update deciding section 33 has input processing sections 50 and 51, a ground-surface-height calculating section 53, an excavation-depth calculating section 55 and an update-flag output section 57.

The input processing section 50 extracts a bucket-claw-tip XY position and a bucket-claw-tip Z position from a bucket-claw-tip position input from the soil-nature acquiring section 32, and outputs the bucket-claw-tip XY position and the bucket-claw-tip Z position to the ground-surface-height calculating section 53 and the excavation-depth calculating section 55, respectively.

The input processing section 51 extracts ground-surface-height information from a soil-nature map input from the soil-nature-map generating section 34, and outputs the ground-surface-height information to the ground-surface-height calculating section 53.

On the basis of a bucket-claw-tip XY position input from the input processing section 50, and ground-surface-height information input from the input processing section 51, the ground-surface-height calculating section 53 calculates a ground-surface height at the bucket-claw-tip XY position, and outputs the ground-surface height to the excavation-depth calculating section 55.

The excavation-depth calculating section 55 calculates an excavation depth by subtracting a bucket-claw-tip Z position input from the input processing section 50 from a ground-surface height input from the ground-surface-height calculating section 53, and outputs the excavation depth to the update-flag output section 57.

The update-flag output section 57 sets the value of the update flag to 1 in a case where an excavation depth input from the excavation-depth calculating section 55 is larger than 0 (i.e. the bucket-claw-tip position is lower than a ground-surface height), and otherwise sets the value of the update flag to 0. The update-flag output section 57 outputs the update flag to the soil-nature-map generating section 34.

By configuring the soil-nature-map update deciding section 33 in this manner, a decision to update a soil-nature map is made only in a case where the height of the bucket claw tip indicated by a bucket-claw-tip Z position falls below a ground-surface height in a soil-nature map (the height of the bucket claw tip at the last time of excavation).

Figure 8:
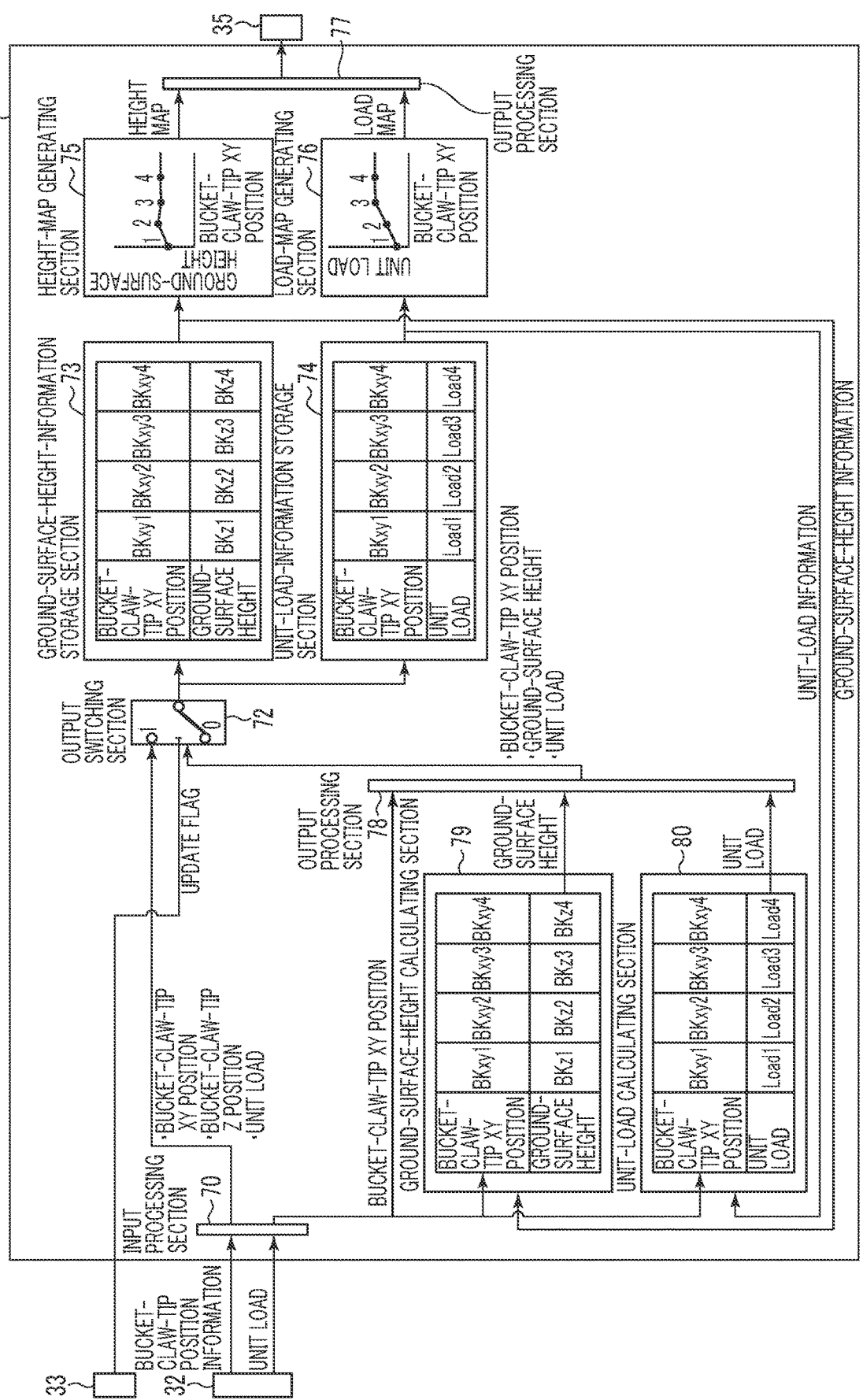
FIG. 8 is a figure illustrating a calculation logic of a soil-nature-map generating section illustrated in FIG. 3.

FIG. 8 is a figure illustrating a calculation logic of the soil-nature-map generating section 34.

The soil-nature-map generating section 34 has an input processing section 70, an output switching section 72, a ground-surface-height-information storage section 73, a unit-load-information storage section 74, a height-map generating section 75, a load-map generating section 76, output processing sections 77 and 78, a ground-surface-height calculating section 79 and a unit-load calculating section 80.

The input processing section 70 outputs, to the output switching section 72, a bucket-claw-tip position (a bucket-claw-tip XY position and a bucket-claw-tip Z position) and a unit load input from the soil-nature acquiring section 32, and outputs the bucket-claw-tip XY position to the output processing section 78, the ground-surface-height calculating section 79 and the unit-load calculating section 80.

Operation according to the value of the update flag input from the soil-nature-map update deciding section 33 is explained below.

In a Case where the Update Flag is 1

The output switching section 72 selects a bucket-claw-tip position (a bucket-claw-tip XY position, and a bucket-claw-tip Z position) and a unit load input from the input processing section 70, and outputs the bucket-claw-tip position and the unit load to the ground-surface-height-information storage section 73 and the unit-load-information storage section 74.

The ground-surface-height-information storage section 73 stores a bucket-claw-tip Z position input from the output switching section 72 as a ground-surface height at a bucket-claw-tip XY position input from the output switching section 72.

The unit-load-information storage section 74 stores a unit load input from the output switching section 72 as a unit load at a bucket-claw-tip XY position input from the output switching section 72. Note that in FIG. 8, although the ground-surface-height-information storage section 73 and the unit-load-information storage section 74 are described so as to store information about four points, the number of points about which information is to be stored may be changed as appropriate.

On the basis of information stored in the ground-surface-height-information storage section 73, the height-map generating section 75 generates a height map indicating the relationship between bucket-claw-tip XY positions and ground-surface heights, and outputs the height map to the output processing section 77.

On the basis of information stored in the unit-load-information storage section 74, the load-map generating section 76 generates a load map indicating the relationship between bucket-claw-tip XY positions and unit loads, and outputs the load map to the output processing section 77.

In map generation performed at the height-map generating section 75 and the load-map generating section 76, appropriate processes are performed. For example, linear interpolation is performed for a range between points about which information is stored, and for a range for which linear interpolation cannot be performed (a range from a point located closest to an outer edge of a construction-subject ground surface to the outer edge), a ground-surface height and a unit load at the point located closest to the outer edge are retained.

The output processing section 77 outputs, to the load estimating section 35, a set of a height map generated at the height-map generating section 75 and a load map generated at the load-map generating section 76.

In a Case where the Update Flag is 0

On the basis of a bucket-claw-tip XY position input from the input processing section 70 and ground-surface-height information input from the ground-surface-height-information storage section 73, the ground-surface-height calculating section 79 calculates a bucket-claw-tip Z position at the bucket-claw-tip XY position, and outputs the bucket-claw-tip Z position to the output processing section 78.

On the basis of a bucket-claw-tip XY position input from the input processing section 70 and unit-load information input from the unit-load-information storage section 74, the unit-load calculating section 80 calculates unit-load information at the bucket-claw-tip XY position, and outputs the unit-load information to the output processing section 78.

The output processing section 78 outputs, to the output switching section 72, a set of a ground-surface height input from the ground-surface-height calculating section 79 and unit-load information input from the unit-load calculating section 80.

The output switching section 72 selects an output of the output processing section 78, and outputs the selected output to the ground-surface-height-information storage section 73 and the unit-load-information storage section 74. Since the ground-surface-height-information storage section 73 and the unit-load-information storage section 74 receive values as inputs from the output switching section 72, which are the same values as those that they retain, the values are not updated at the ground-surface-height-information storage section 73 and the unit-load-information storage section 74. Since the ground-surface-height-information storage section 73 and the unit-load-information storage section 74 are not updated, maps are not updated also at the height-map generating section 75 and the load-map generating section 76.

By configuring the soil-nature-map generating section 34 in this manner, in a case where the update flag is 1 (the bucket claw tip is located below the bucket claw tip at the last time of excavation), the ground-surface-height information and the unit-load information are updated, and in a case where the update flag is 0 (the bucket claw tip is located at the same height as or below the bucket claw tip at the last time of excavation), the ground-surface-height information and the unit-load information are not updated, but keep having previous values. That is, the soil-nature map is updated only when a ground is excavated further with the bucket 7, and the soil-nature map is not updated when the bucket 7 is moving in the air or in other situations.

Figure 9:
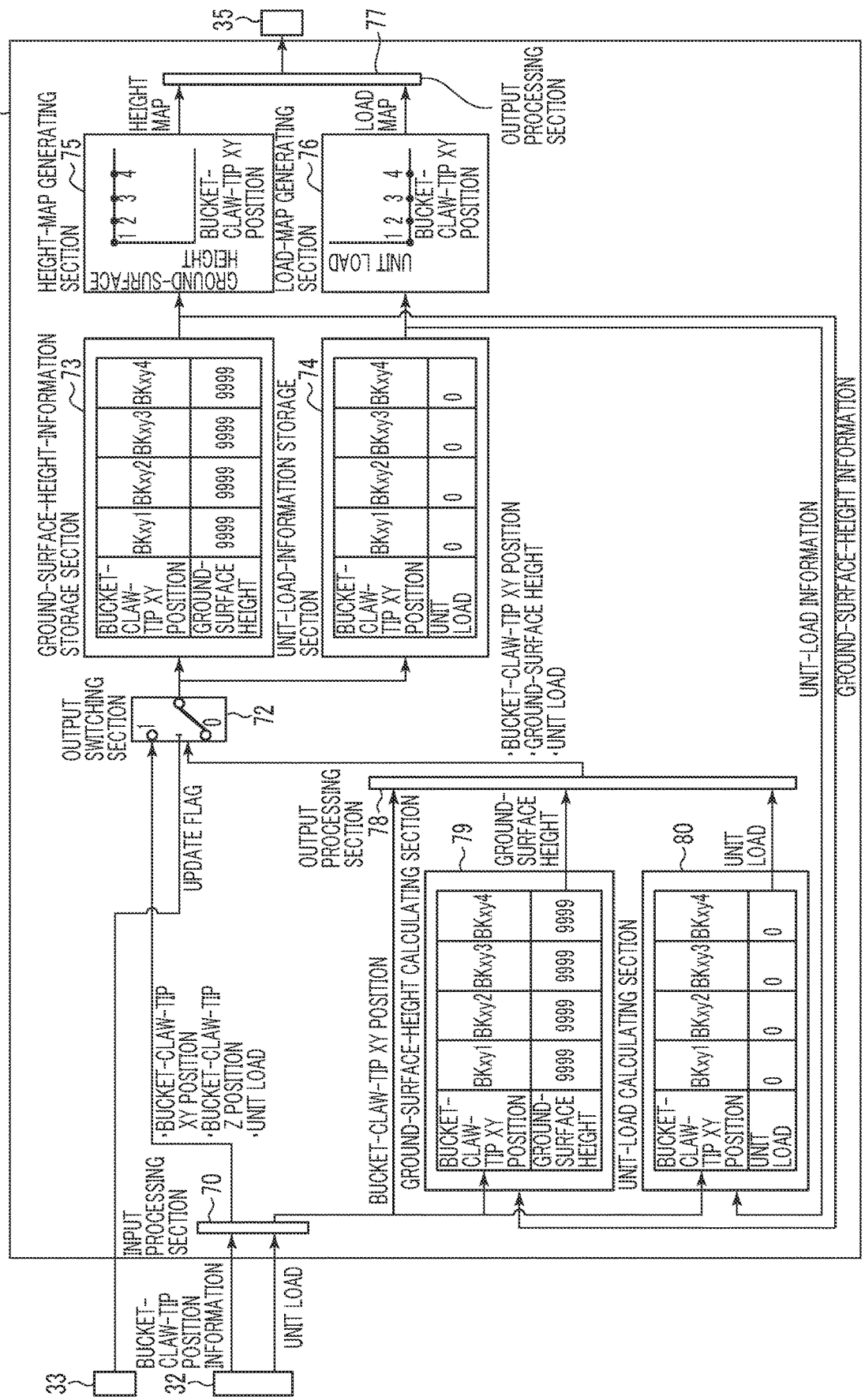
FIG. 9 is a figure illustrating an initial state of the calculation logic of the soil-nature-map generating section illustrated in FIG. 3.

FIG. 9 is a figure illustrating an initial state of the calculation logic of the soil-nature-map generating section 34. Ground-surface heights (e.g. 9999) larger than the maximum bucket height that can be computed from a work area of the hydraulic excavator 200 have been input to the ground-surface-height-information storage section 73. As unit loads, 0 has been input to the unit-load-information storage section 74.

With a configuration like this, it is possible to prevent the height-map generating section 75 and the load-map generating section 76 from becoming unstable. In addition, because ground-surface heights larger than the maximum bucket height that can be computed from the work area of the hydraulic excavator 200 have been input to the ground-surface-height-information storage section 73, an excavation depth that is calculated at the excavation-depth calculating section 55 of the soil-nature-map update deciding section 33 becomes larger than 0 when the hydraulic excavator 200 operates, and the update flag outputted from the update-flag output section 57 is now 1. Then, on the basis of soil-nature information input from the soil-nature acquiring section 32, the values at the ground-surface-height-information storage section 73 and the unit-load-information storage section 74 are updated at the soil-nature-map generating section 34. That is, the soil-nature map can be generated surely in accordance with operation of the hydraulic excavator 200.

Figure 10:
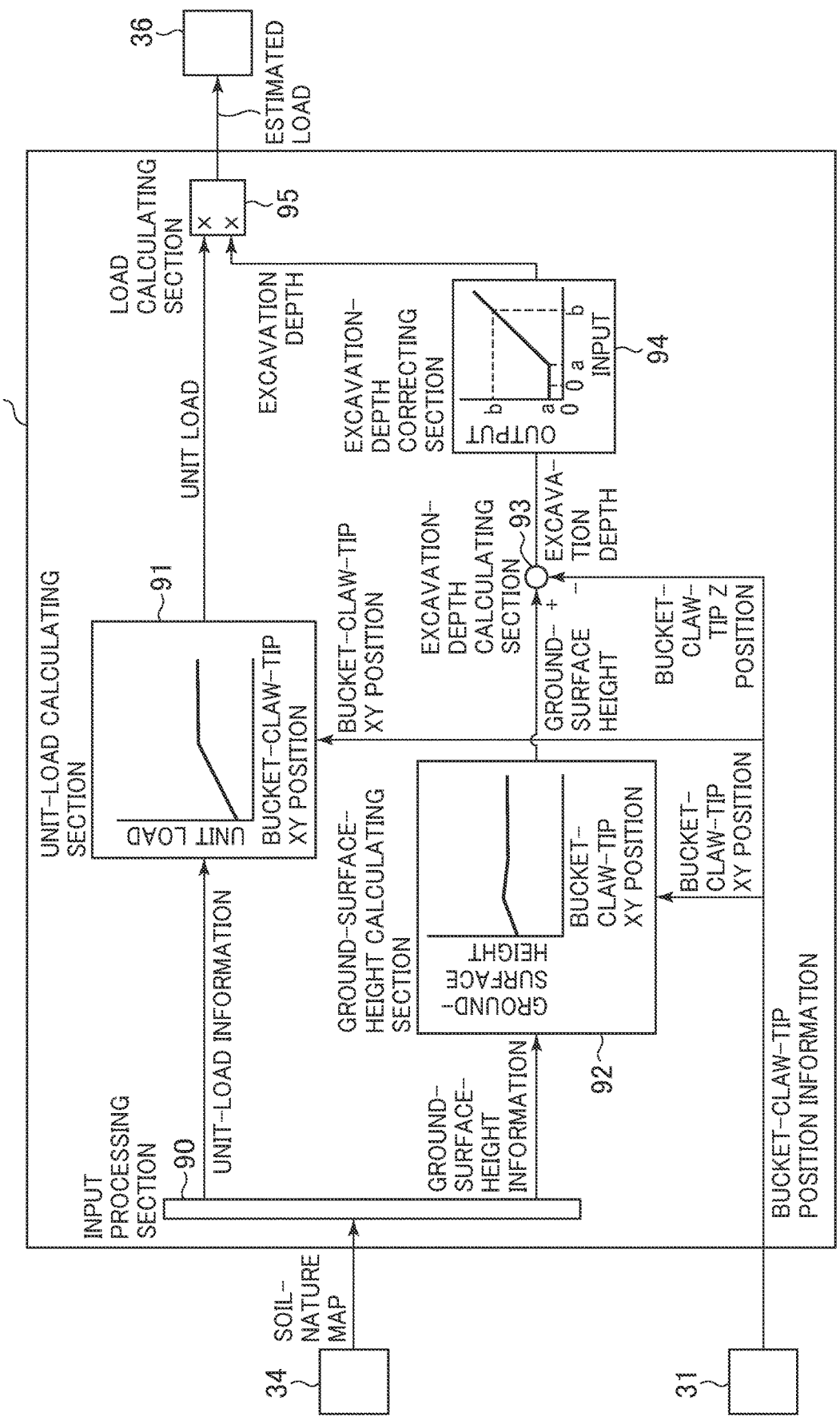
FIG. 10 is a figure illustrating a calculation logic of a load estimating section illustrated in FIG. 3.

FIG. 10 is a figure illustrating a calculation logic of the load estimating section 35.

In FIG. 10, the load estimating section 35 has an input processing section 90, a unit-load calculating section 91, a ground-surface-height calculating section 92, an excavation-depth calculating section 93, an excavation-depth correcting section 94 and a load calculating section 95.

The input processing section 90 extracts unit-load information and ground-surface-height information from a soil-nature map input from the soil-nature-map generating section 34, and outputs the unit-load information and the ground-surface-height information to the unit-load calculating section 91 and the ground-surface-height calculating section 92, respectively. Here, the unit-load information is information about unit loads associated with horizontal positions of a construction-subject ground surface.

On the basis of unit-load information input from the input processing section 90 and a bucket-claw-tip target XY position included in a bucket-claw-tip target position, the unit-load calculating section 91 calculates a unit load at the bucket-claw-tip target XY position, and outputs the unit load to the load calculating section 95.

On the basis of ground-surface-height information input from the input processing section 90 and a bucket-claw-tip target XY position included in a bucket-claw-tip target position input from the semi-automatic control section 31, the ground-surface-height calculating section 92 calculates a ground-surface height at the bucket-claw-tip target XY position, and outputs the ground-surface height to the excavation-depth calculating section 93.

The excavation-depth calculating section 93 calculates an excavation depth by subtracting a bucket-claw-tip target Z position included in a bucket-claw-tip target position from a ground-surface height input from the ground-surface-height calculating section 92, and outputs the excavation depth to the excavation-depth correcting section 94.

The excavation-depth correcting section 94 corrects an excavation depth input from the excavation-depth calculating section 93 such that the excavation depth does not become a value equal to or smaller than 0, and outputs the excavation depth to the load calculating section 95. Correction is performed at the excavation-depth correcting section 94 in this manner in order to prevent calculation results of the load calculating section 95 mentioned below from becoming negative values.

The load calculating section 95 calculates an estimated load by multiplying a unit load input from the unit-load calculating section 91 and an excavation depth input from the excavation-depth correcting section 94, and outputs the estimated load to the command correcting section 36.

By configuring the load estimating section 35 in this manner, it is possible to estimate an excavation load at the bucket-claw-tip target position.

Figure 11:
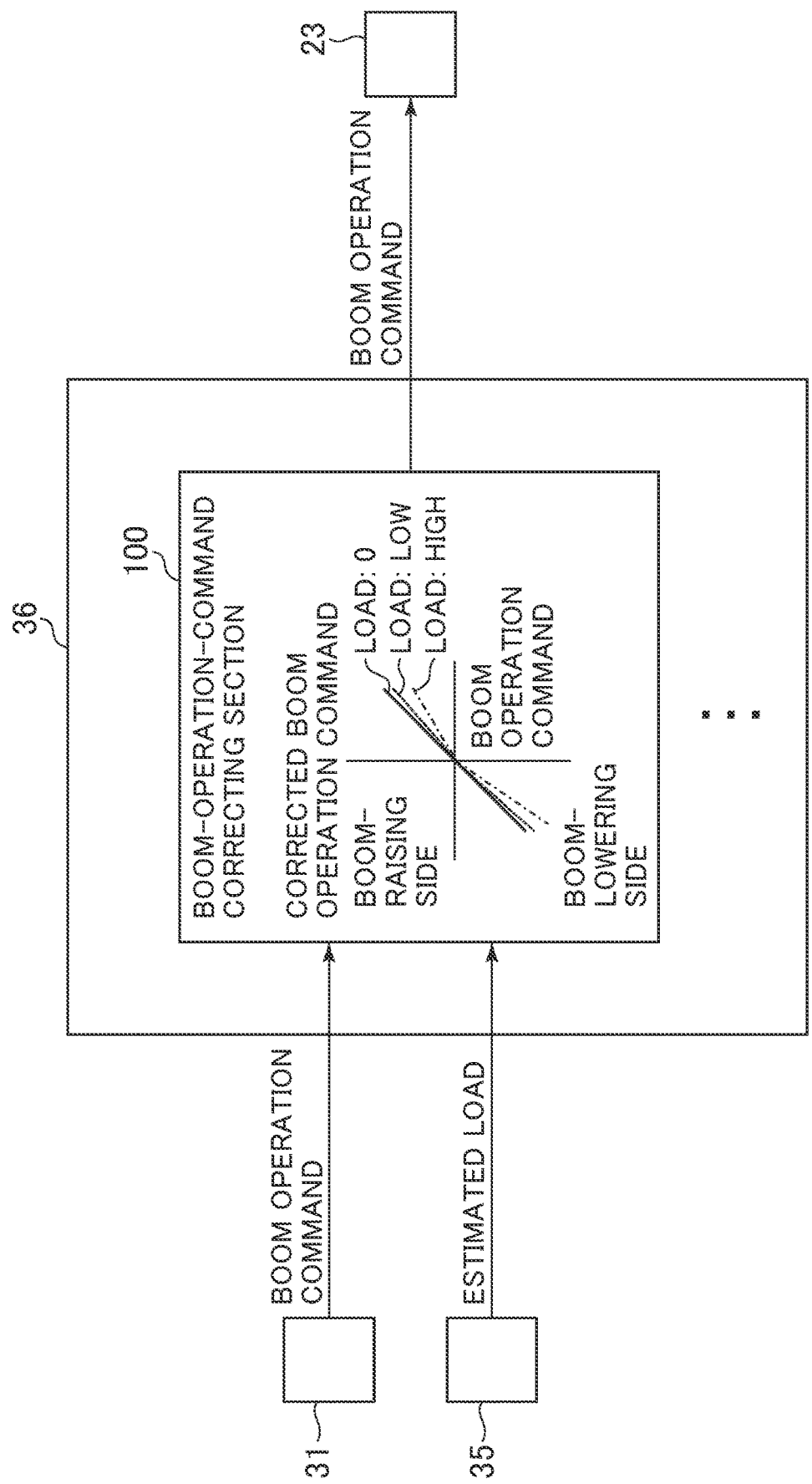
FIG. 11 is a figure illustrating a calculation logic of a command correcting section illustrated in FIG. 3.

FIG. 11 is a figure illustrating a calculation logic of the command correcting section 36.

In FIG. 11, the command correcting section 36 has a boom-operation-command correcting section 100.

The boom-operation-command correcting section 100 corrects a boom operation command input from the semi-automatic control section 31 in accordance with an estimated load input from the load estimating section 35, and outputs the corrected boom operation command to the hydraulic device 23. The boom-operation-command correcting section 100 corrects the boom operation command so as to actuate the boom to the boom-lowering side as the estimated load increases.

By configuring the command correcting section 36 in this manner, it is possible to correct the operation command given to the hydraulic device 23 such that the excavation force of the front work implement 210 increases in accordance with the estimated load. Note that although illustrations are omitted, an arm-operation-command correcting section and a bucket-command correcting section may be provided further, and an arm operation command and a bucket operation command may be corrected so as to actuate the arm and the bucket to the crowding side is increased in accordance with the estimated load.

In the present embodiment, the work machine 200 includes: the work implement 210 having the boom 5, the arm 6 and the bucket 7; the operation devices 15L and 15R that give instructions to operate the work implement 210; the controller 20 that controls operation of the work implement 210 in accordance with operation signals outputted from the operation devices 15L and 15R; the construction-target determining device 21 that determines a construction target; and the bucket-position measuring device 11 that measures the claw-tip position of the bucket 7. The controller 20 converts the operation signals outputted from the operation devices 15L and 15R into an operation command given to the work implement 210, and corrects the operation command in accordance with the construction target outputted from the construction-target determining device 21. The work machine 200 includes the load measuring device 24 that measures a drive load of the work implement 210. The controller 20 calculates a bucket-claw-tip target position on the basis of the construction target outputted from the construction-target determining device 21, and the bucket-claw-tip position outputted from the bucket-position measuring device 11; acquires soil-nature information on the basis of the operation command, the bucket-claw-tip position outputted from the bucket-position measuring device 11 and the drive load outputted from the load measuring device 24; generates a soil-nature map on the basis of the bucket-claw-tip position and the soil-nature information; calculates an estimated load that is an estimate of an excavation load on the basis of the soil-nature map and the bucket-claw-tip target position; and corrects the operation command in accordance with the estimated load.

According to the thus-configured present embodiment, the soil-nature information is acquired on the basis of the operation command given to the work implement 210, the bucket-claw-tip position outputted from the bucket-position measuring device 11, and the drive load outputted from the load measuring device 24; the soil-nature map is generated on the basis of the bucket-claw-tip position and the soil-nature information; the estimated load that is an estimate of the excavation load is calculated on the basis of the soil-nature map and the bucket-claw-tip target position; and the operation command is corrected in accordance with the estimated load. Thereby, the operation command according to semi-automatic control is corrected in accordance with excavation depths and differences in the soil nature, thus it becomes possible to maintain the construction precision of the semi-automatic control irrespective of the excavation depths and the differences in the soil nature.

In addition, the soil-nature information in the present embodiment includes a unit load that is an excavation load per unit excavation depth, and the controller 20 calculates a ground-surface height at a bucket-claw-tip front-rear/left-right position included in the bucket-claw-tip position on the basis of ground-surface-height information included in the soil-nature map and the bucket-claw-tip front-rear/left-right position; calculates an excavation depth by subtracting a bucket-claw-tip height included in the bucket-claw-tip position from the ground-surface height; calculates the excavation load on the basis of the operation command given to the work implement 210 and the drive load of the work implement 210; and calculates the unit load by dividing the excavation load by the excavation depth. Thereby, it becomes possible to acquire the soil-nature information (unit load) during excavation operation.

In addition, the controller 20 calculates a ground-surface height at a bucket-claw-tip front-rear/left-right position included in the bucket-claw-tip position on the basis of ground-surface-height information included in the soil-nature map and the bucket-claw-tip front-rear/left-right position; and updates the soil-nature map with the soil-nature information in a case where a bucket-claw-tip height included in the bucket-claw-tip position falls below the ground-surface height. Thereby, it is possible to prevent the soil-nature map from being updated undesirably in a case where excavation is not being performed.

In addition, the controller 20 sets an initial value of a ground-surface height included in ground-surface-height information included in the soil-nature map to a value larger than a maximum reachable height of the work implement 210; and sets an initial value of a unit load included in unit-height information included in the soil-nature map to a value equal to or smaller than zero. Thereby, it becomes possible to make soil-nature information acquired during excavation work surely be reflected in the ground-surface-height information and unit-load information.

In addition, the controller 20 calculates a unit load that is an excavation load per unit excavation depth at a bucket-claw-tip target front-rear/left-right position included in the bucket-claw-tip target position on the basis of unit-load information included in the soil-nature map and the bucket-claw-tip target front-rear/left-right position; calculates a ground-surface height at the bucket-claw-tip target front-rear/left-right position on the basis of ground-surface-height information included in the soil-nature map and the bucket-claw-tip target front-rear/left-right position; calculates an excavation depth by subtracting a bucket-claw-tip target height (Z position) included in the bucket-claw-tip target position from the ground-surface height; and calculates the estimated load by multiplying the unit load and the excavation depth. Thereby, it becomes possible to estimate the excavation load in accordance with excavation depths and differences in soil nature.

In addition, the controller 20 corrects a boom operation command included in the operation command so as to actuate the boom to the boom-lowering side as the estimated load increases. Thereby, it becomes possible to increase the excavation force of the work implement 210 as the estimated load increases.

Second Embodiment

A second embodiment of the present invention is explained, with focus given to differences from the first embodiment.

Figure 12:
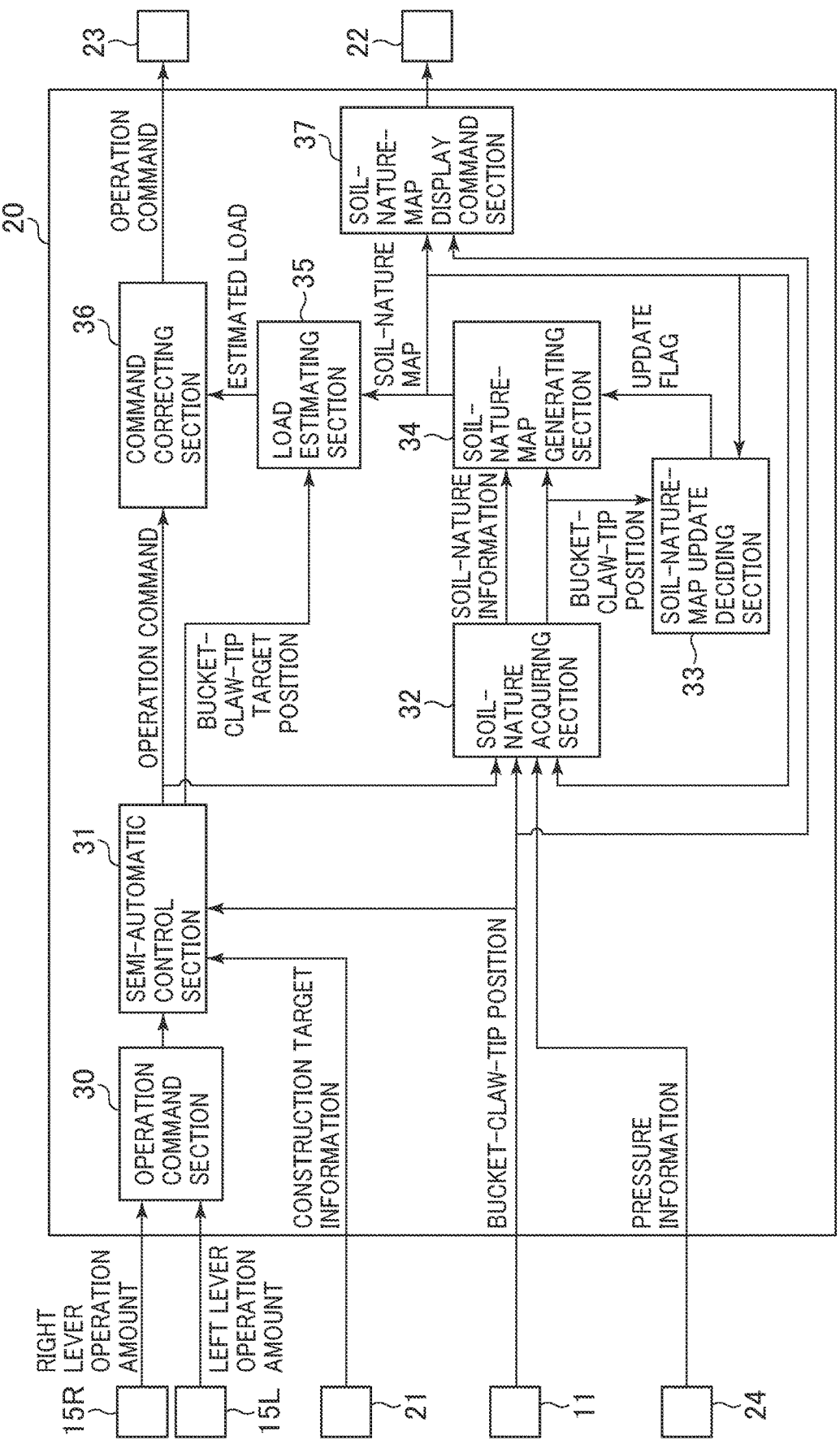
FIG. 12 is a functional block diagram of the controller in a second embodiment of the present invention.

FIG. 12 is a functional block diagram of the controller 20 in the present embodiment.

In FIG. 12, the controller 20 further has a soil-nature-map display command section 37. On the basis of a soil-nature map input from the soil-nature-map generating section 34 and a bucket-claw-tip position input from the bucket-position measuring device 11, the soil-nature-map display command section 37 generates display information, and outputs the display information to the display device 22.

Figure 13:
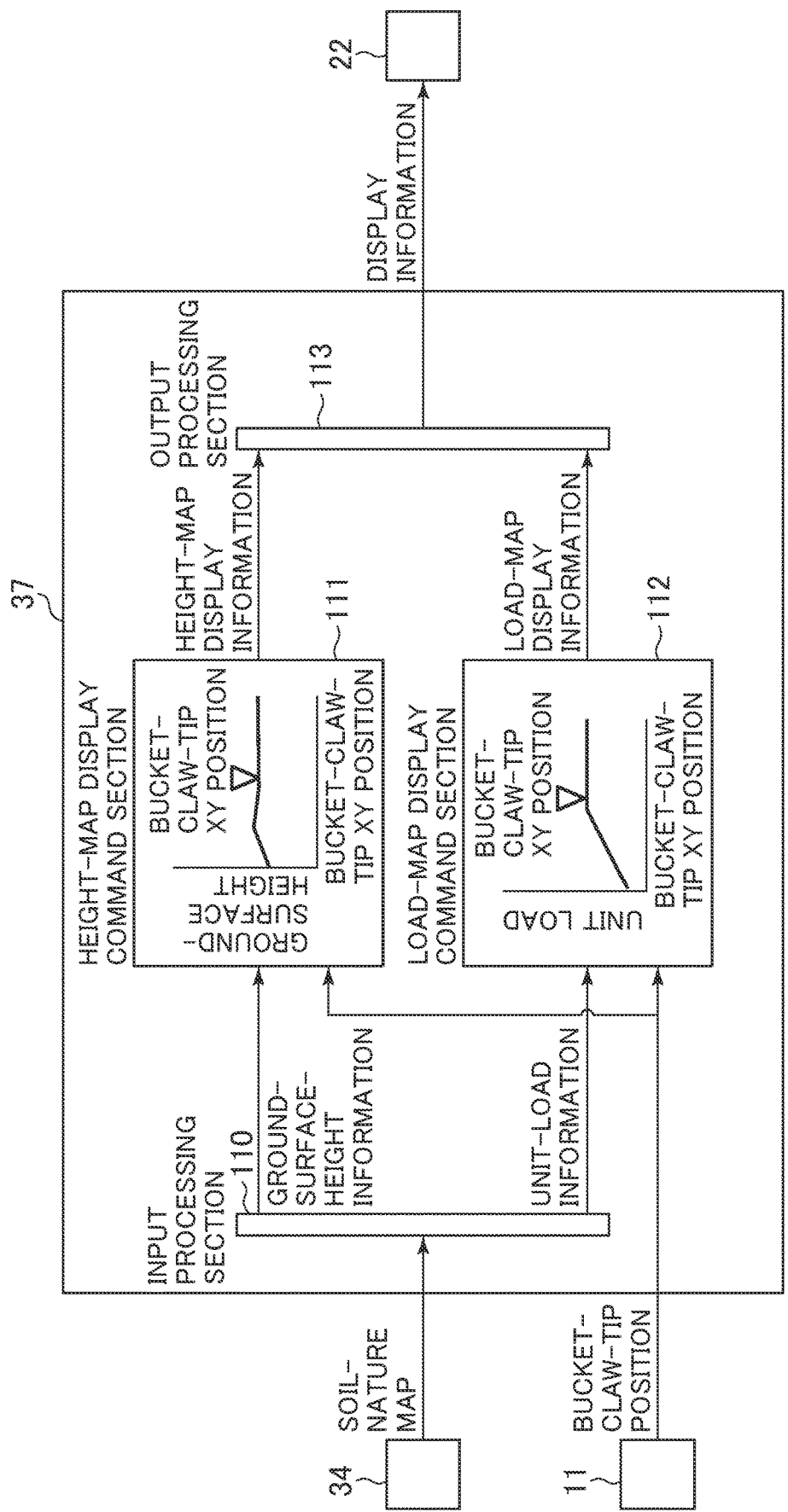
FIG. 13 is a figure illustrating a calculation logic of a soil-nature-map display command section illustrated in FIG. 12.

FIG. 13 is a figure illustrating a calculation logic of the soil-nature-map display command section 37.

In FIG. 13, the soil-nature-map display command section 37 has an input processing section 110, a height-map display command section 111, a load-map display command section 112 and an output processing section 113.

The input processing section 110 extracts ground-surface-height information and unit-load information from a soil-nature map input from the soil-nature-map generating section 34, and outputs the ground-surface-height information and the unit-load information to the height-map display command section 111 and the load-map display command section 112, respectively.

The height-map display command section 111 generates height-map display information by superimposing a bucket-claw-tip position input from the bucket-position measuring device 11 onto ground-surface-height information input from the input processing section 110, and outputs the height-map display information to the output processing section 113.

The load-map display command section 112 generates load-map display information by superimposing a bucket-claw-tip XY position included in a bucket-claw-tip position input from the bucket-position measuring device 11 onto unit-load information input from the input processing section 110, and outputs the load-map display information to the output processing section 113.

The output processing section 113 outputs, to the display device 22, display information that is a set of ground-surface-height display information input from the height-map display command section 111 and unit-load display information input from the load-map display command section 112.

Figure 14:
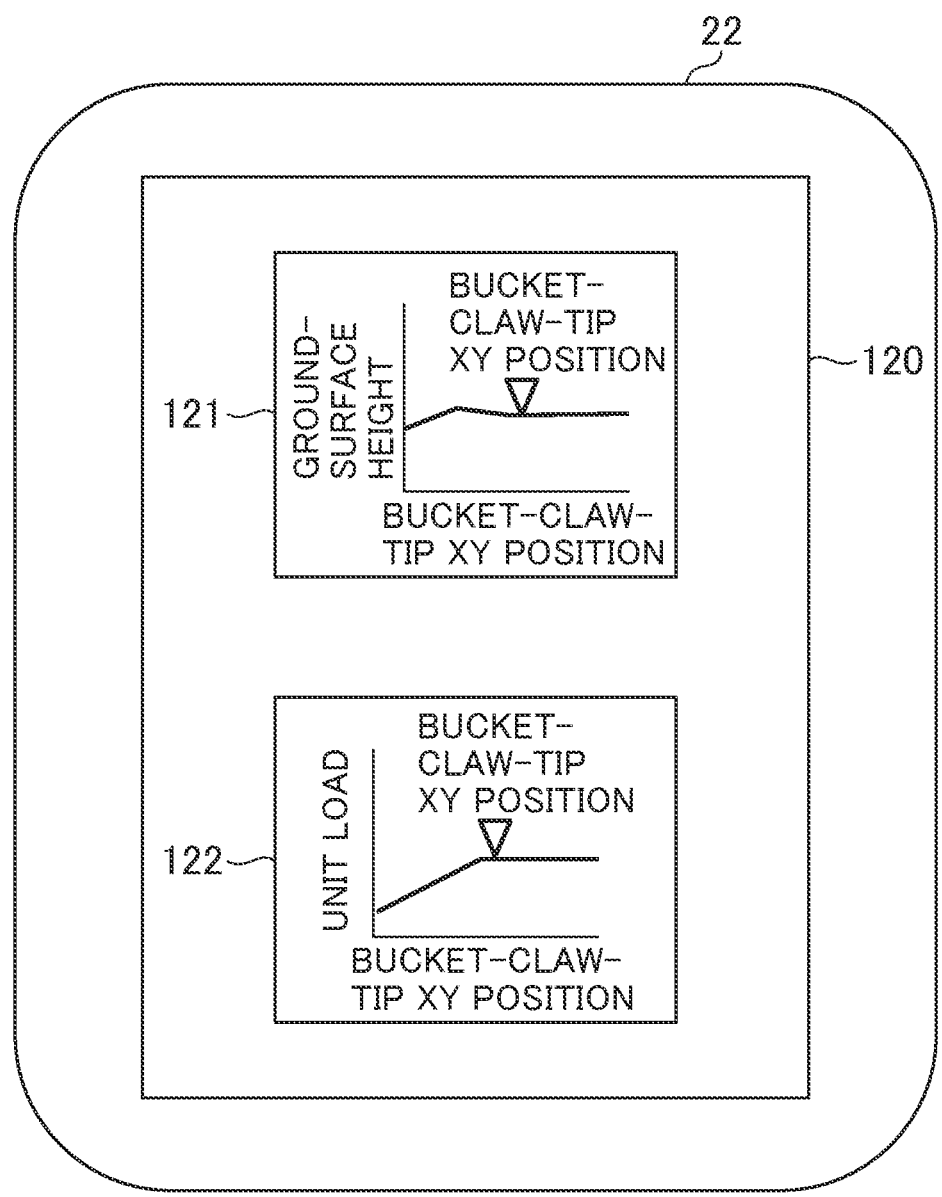
FIG. 14 is a figure illustrating one example of a display screen of a display device.

FIG. 14 is a figure illustrating one example of a display screen of the display device 22.

In FIG. 14, a display screen 120 of the display device 22 displays height-map display information 121 input from the soil-nature-map display command section 37 and load-map display information 122 input from the load-map display command section 112. Note that although the height-map display information 121 and the load-map display information 122 are displayed separately in the example illustrated in FIG. 14, they may be displayed together by applying different colors to the height-map display information 121 and the load-map display information 122 or by other manners of display.

The controller 20 in the present embodiment generates the height-map display information 121 on the basis of ground-surface-height information included in the soil-nature map and the bucket-claw-tip position; generates the load-map display information 122 on the basis of unit-load information included in the soil-nature map and a bucket-claw-tip front-rear/left-right position included in the bucket-claw-tip position; and outputs the height-map display information 121 and the load-map display information 122 to the display device 22. Thereby, an operator of the hydraulic excavator 200 can perform excavation work while checking a positional relationship between the bucket-claw-tip position and the ground surface, and soil-nature information (unit load) on the display screen 120 of the display device 22.

Although embodiments of the present invention have been mentioned in detail thus far, the present invention is not limited to the embodiments described above, but includes various modification examples. For example, the embodiments described above are explained in detail in order to explain the present invention in an easy-to-understand manner, and the present invention is not necessarily limited to embodiments including all the configurations explained. In addition, some configurations of an embodiment can be added to the configurations of another embodiment, some configurations of an embodiment can be removed, or some configurations of an embodiment can be replaced with configurations of another embodiment.

DESCRIPTION OF REFERENCE CHARACTERS

1: Travel structure
2: Swing structure
2a: Swing frame
3: Counter weight
4: Cab
5: Boom
5a: Boom cylinder
6: Arm
6a: Arm cylinder
7: Bucket
7a: Bucket cylinder
8: Swing device
8a: Swing motor
9: Pump device 10: Control valve unit
11: Bucket-position measuring device
15L: Left operation lever device
15R: Right operation lever device
20: Controller
21: Construction-target determining device
22: Display device
23: Hydraulic device
24: Pressure sensor (load measuring device)
30: Operation command section
31: Semi-automatic control section
32: Soil-nature acquiring section
33: Soil-nature-map update deciding section
34: Soil-nature-map generating section
35: Load estimating section
36: Command correcting section
37: Soil-nature-map display command section
40: Input processing section
41: Ground-surface-height calculating section
42: Excavation-depth calculating section
43: Excavation-depth correcting section
44: Excavation-load calculating section
45: Load correcting section
46: Unit-load calculating section
47: Output processing section
50: Input processing section
51: Input processing section
53: Ground-surface-height calculating section
55: Excavation-depth calculating section
57: Update-flag output section
70: Input processing section
72: Output switching section
73: Ground-surface-height-information storage section
74: Unit-load-information storage section
75: Height-map generating section
76: Load-map generating section
77: Output processing section
78: Output processing section
79: Ground-surface-height calculating section
80: Unit-load calculating section
90: Input processing section
91: Unit-load calculating section
92: Ground-surface-height calculating section
93: Excavation-depth calculating section
94: Excavation-depth correcting section
95: Load calculating section
100: Boom-operation-command correcting section
110: Input processing section
111: Height-map display command section
112: Load-map display command section
113: Output processing section
120: Display screen
121: Height-map display information
122: Load-map display information
200: Hydraulic excavator (work machine)
210: Front work implement
300: Hydraulic control system

The invention claimed is:

1. A work machine comprising:
a work implement having a boom, an arm and a bucket;
an operation device that gives an instruction to operate the work implement;
a controller that outputs an operation command to control operation of the work implement in accordance with an operation signal outputted from the operation device;
a construction-target determining device that outputs a designed surface; and
a bucket-position measuring device that measures a bucket-claw-tip position of the bucket, wherein
the work machine includes a load measuring device that measures a drive load of the work implement, and
the controller is configured to:
perform, in order for the bucket to excavate a ground according to the designed surface inputted from the construction-target determining device, a semi-automatic control by calculating a bucket-claw-tip target position and correcting the operation command, such that a velocity of the bucket is restricted more as a deviation between the designed surface and the bucket-claw-tip position measured by the bucket-position measuring device decreases;
acquire, when an excavation work is performed with the bucket, soil-nature information on a basis of the operation command, the bucket-claw-tip position outputted from the bucket-position measuring device, and the drive load outputted from the load measuring device, the soil nature information including a ground-surface height and a unit load which is a load per unit excavation depth;
generate a soil-nature map on a basis of the bucket-claw-tip position and the soil-nature information, the soil-nature map including a height map which indicates a relationship between the bucket-claw-tip position and the ground-surface height and a load map which indicates a relationship between the bucket-claw-tip position and the unit load;
calculate, when the semi-automatic control is performed, an estimated load that is an estimate of an excavation load on a basis of the height map of the soil-nature map, the load map of the soil-nature map, and the bucket-claw-tip target position; and
correct the operation command such that excavation force of the work implement increases as the estimated load increases.

2. The work machine according to claim 1, wherein the controller is further configured to:
calculate the ground-surface height at a bucket-claw-tip front-rear/left-right position included in the bucket-claw-tip position on a basis of the height map of the soil-nature map and the bucket-claw-tip front-rear/left-right position;
calculate an excavation depth by subtracting a bucket-claw-tip height included in the bucket-claw-tip position from the ground-surface height;
calculate the excavation load on a basis of the operation command and the drive load; and
calculate the unit load by dividing the excavation load by the excavation depth.

3. The work machine according to claim 1, wherein the controller is further configured to:
calculate the ground-surface height at a bucket-claw-tip front-rear/left-right position included in the bucket-claw-tip position on a basis of the height map of the soil-nature map and the bucket-claw-tip front-rear/left-right position; and
update the soil-nature map in a case where a bucket-claw-tip height included in the bucket-claw-tip position falls below the ground-surface height.

4. The work machine according to claim 1, wherein the controller is further configured to:
set an initial value of a of the ground-surface height included in the height map of the soil-nature map to a value larger than a maximum reachable height of the work implement; and set an initial value of the unit load included in the load map of the soil-nature map to a value equal to or smaller than zero.

5. The work machine according to claim 1, wherein the controller is further configured to:
    calculate the unit load at a bucket-claw-tip target front-rear/left-right position included in the bucket-claw-tip target position on a basis of the load map of the soil-nature map and the bucket-claw-tip target front-rear/left-right position;
    calculate a ground-surface height at the bucket-claw-tip target front-rear/left-right position on a basis of the height map of the soil-nature map and the bucket-claw-tip target front-rear/left-right position;
    calculate an excavation depth by subtracting a bucket-claw-tip target height included in the bucket-claw-tip target position from the ground-surface height; and
    calculate the estimated load by multiplying the unit load and the excavation depth.

6. The work machine according to claim 1, wherein the controller is further configured to correct a boom operation command included in the operation command so as to actuate the boom to a boom-lowering side as the estimated load increases.

7. The work machine according to claim 1, further comprising:
    a display device, wherein
    the controller is further configured to:
        generate height-map display information on a basis of the height map of the soil-nature map and the bucket-claw-tip position;
        generate load-map display information on a basis of the load map of the soil-nature map and a bucket-claw-tip front-rear/left-right position included in the bucket-claw-tip position; and
        output the height-map display information and the load-map display information to the display device.

* * * * *